United States Patent [19]

Lemelson

[11] Patent Number: 4,681,548

[45] Date of Patent: Jul. 21, 1987

[54] AUDIO VISUAL APPARATUS AND METHOD

[76] Inventor: Jerome H. Lemelson, 48 Parkside Dr., Princeton, N.J. 08540

[21] Appl. No.: 826,312

[22] Filed: Feb. 5, 1986

[51] Int. Cl.$^4$ .............................................. G09B 7/06
[52] U.S. Cl. .................................... 434/311; 434/308
[58] Field of Search ....................... 434/308, 309, 311

[56] References Cited

U.S. PATENT DOCUMENTS

| | | | |
|---|---|---|---|
| 3,695,525 | 10/1972 | Cleary | 434/311 |
| 4,031,634 | 6/1977 | Stastny et al. | 434/311 |
| 4,425,099 | 1/1984 | Naden | 434/311 |
| 4,468,204 | 8/1984 | Scott et al. | 434/309 |

Primary Examiner—Leo P. Picard

[57] ABSTRACT

An electronic system and method employing a plurality of record sheets or cards, for teaching, training, quizzing, testing and game playing when a person interacts therewith. In one form, a record card containing printed matter is inserted into a recepticle in a support and caused to move along a guide to an operating position where its printed face may be viewed and read. As it so travels, coded information on a border portion of the card is sensed to generate coded electrical signals, which are applied to effect one or more functions such as the programming of a computer, the selection of recordings from a memory, the generation of selected speech signals and sounds thereof, the control of a display or other interactive device or devices, the activation or control of a scoring means or the selective activation of testing electronic circuitry. In another form, one of a plurality of record cards is selectively disposed in a U-shaped recepticle or the like by hand and a coded edge portion thereof is read to generate coded electrical signals to identify the card or its printed contents. The card or sheet is predeterminately positioned and one or more selected areas thereof, which are indicated by printing, are pressed by finger to close selected switches of a plurality of pressure sensitive switches to provide signal or circuit means for performing such functions as answering questions, programming computing electrical circuits, selecting recordings from a memory, activating a display generating select speech from a memory, scoring, etc.

20 Claims, 10 Drawing Figures

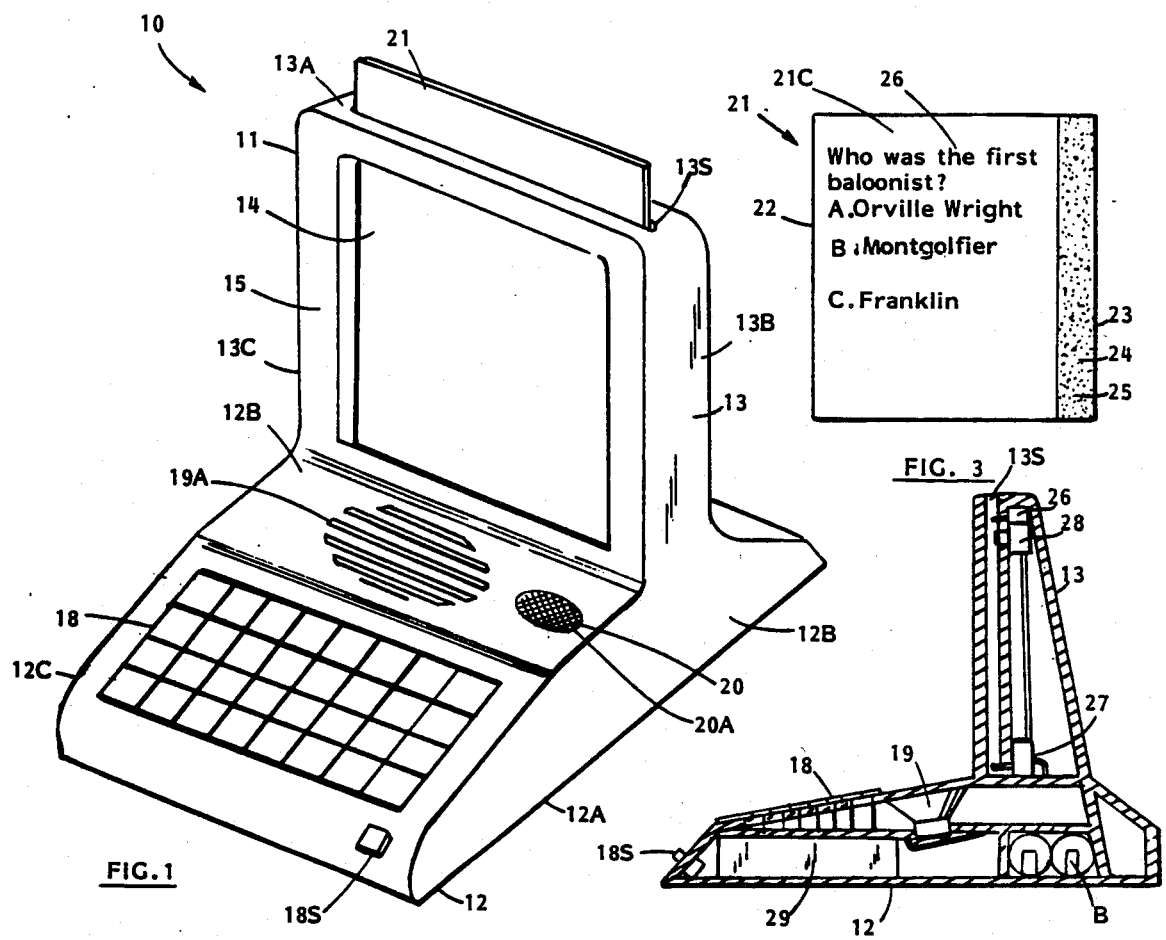
FIG. 1
FIG. 3
FIG. 2
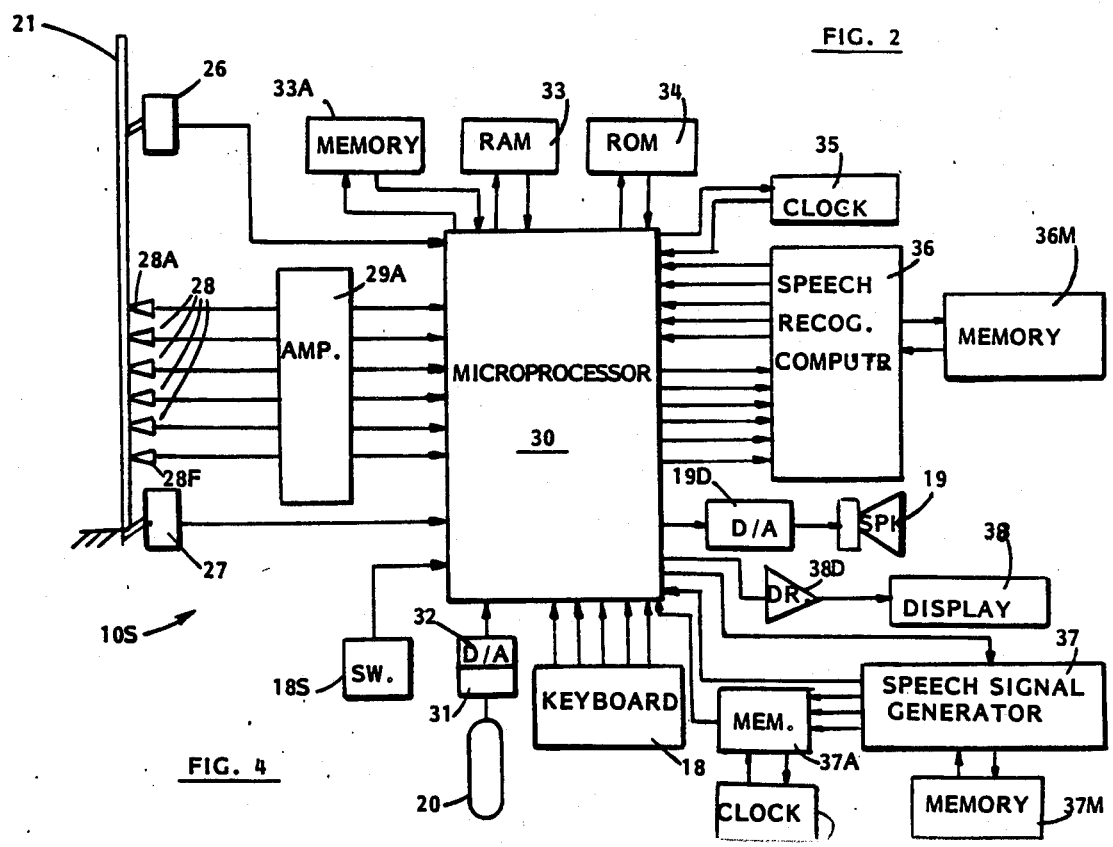
FIG. 4

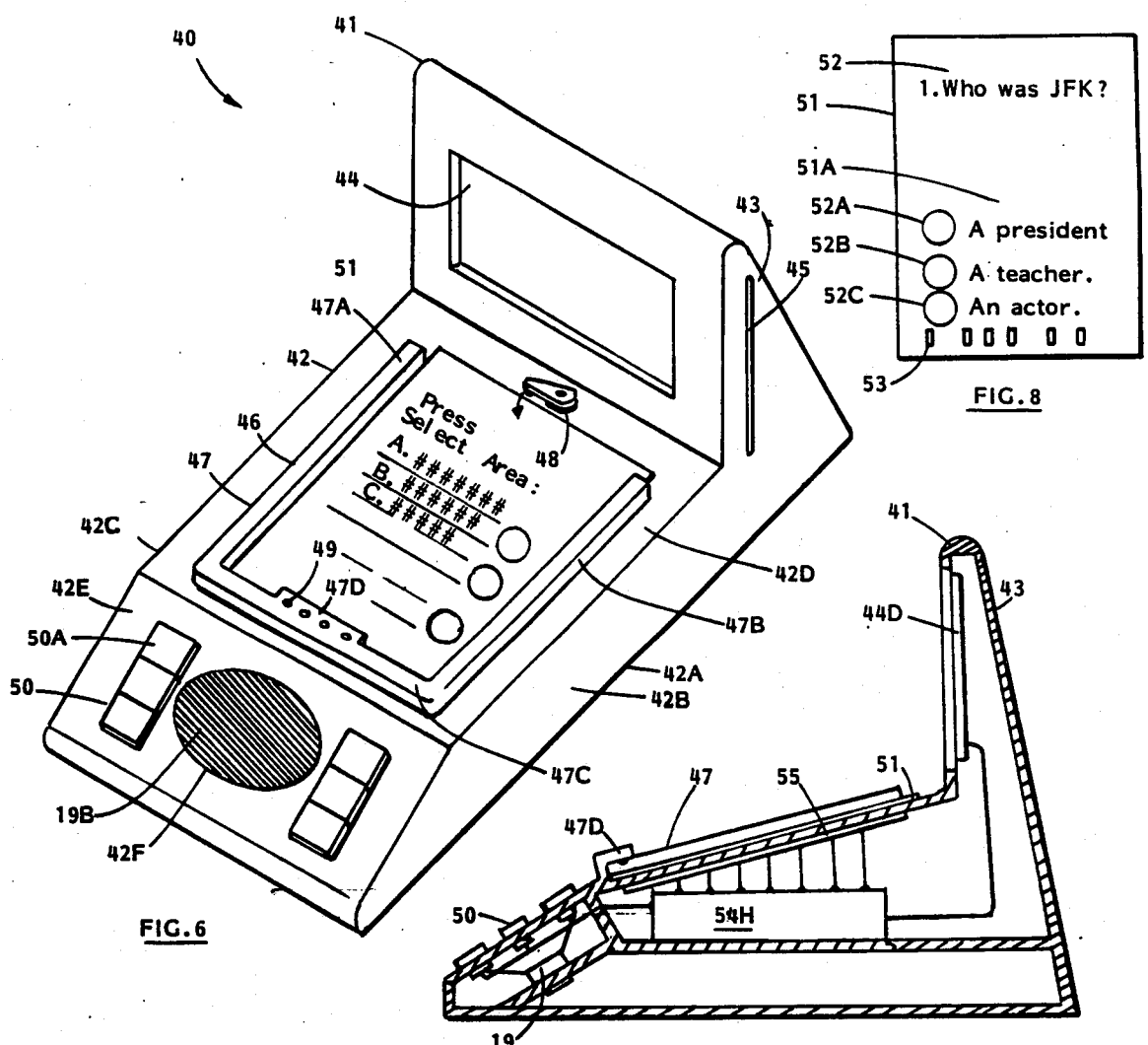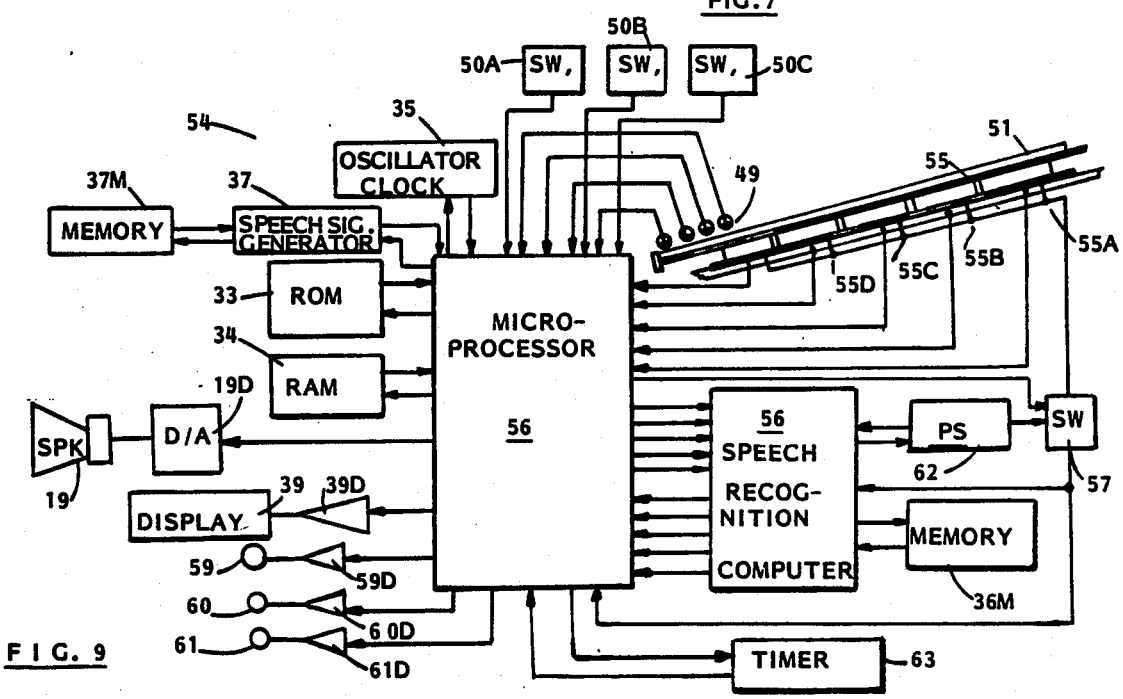

AUDIO VISUAL APPARATUS AND METHOD

SUMMARY OF THE INVENTION

This invention relates to an audio-visual system and method for teaching various subjects and in particular to such a system in which audio and visual information are provided on a plurality of record cards, the visual information being viewable to a person located in front of a card support while data such as audio signals and message codes are reproduced from the record card, stored in memory, and selectively reproduced from such memory to generate speech and other sounds when the person performs one or more manual functions, such as the closing of selected push-button, touch or otherwise operable switches or the operation of one or more electro-mechanical or electronic devices associated with or supported by the display terminal which either provides direct display of indicia, such as printed matter, on a face of the card or, in a modified form, projects or otherwise displays such matters. Both reading and disposing a record card at an operable location are effected without the use of a motor or other form of drive means, such functions being effected by hand, and in a particular form, by gravity. The audio recordings may be in the form of digital recordings of speech or digital code recordings capable of effecting, when reproduced and applied to an electronic synthetic speech generating computer, select signals of synthetic speech which are applied to a digital-to-analog converter and then to a speaker for generating select words and other sounds of speech.

In a particular form, the sensed recordings are code recordings capable of generating select words of speech by controlling, when applied to an address means, a synthetic speech signal generating circuit which generates and assembles in a second memory signals defining phonems or alophons of speech in a select order which, when clocked out of such second memory and applied to a digital-to-analog converter and then to a microphone, effects the generation of select words of speech.

Accordingly it is a primary object of this invention to provide a new and improved system and method for teaching, training and entertaining employing audio signals or code signals defining audio signals recorded on record cards containing printed visual information, which cards are manually located in a display and reading apparatus.

Another object is to provide an audio-visual system and method for generating audio information as sounds and displaying visual information to be used in a teaching or training mode with such audio information wherein the apparatus does not require the use of a motor or motors for generating such information.

Another object is to provide an audio-visual system and method in which picture information is printed on a plurality of cards, which cards also contain audio information disposed along a strip or band-like area of the cards extending parallel to an edge thereof and which may be easily read by one or more transducers.

Another object is to provide an audio-visual system employing record cards containing printed matter in the form of illustrations and alpha-numeric characters such as words, phrases and sentences and magnetic recordings which may be easily reproduced from each record card, of either speech signals or codes which may be employed to generate speech signals, which audio information may be easily read without the use of a motor or motors.

Another object is to provide an improved system for recording and reproducing audio signals with respect to a plurality of tracks of a magnetic record member.

Another object is to provide an audio-visual system and method employing record cards containing printed matter of visual indicia and printed codes or audio recordings which may be easily reproduced to generate sounds, such as words of speech, on the output of a speaker for teaching and training purposes.

Another object is to provide a system and method for teaching and training individuals and employing recordings provided on record cards including visual information which may be read when the card is disposed at an operable location of a support, wherein the manual placing and movement of the card to such operable location results in the reproduction of recordings from the card which are employed in operating the apparatus such as in programming same and/or in generating sounds of words of select speech.

Another object is to provide a system and method for teaching, training and game playing using inexpensive software in the form of printed sheets and a simple means for manually reacting to the printed data and indicia thereof and effecting an answer or answers to questions defined by printed characters provided on such sheets.

Another object is to provide an improved interactive teaching and quizzing system employing speech regognition and synthetic speech generation.

Another object is to provide a system and method for teaching, quizzing and playing games employing relatively simple and low cost electronic circuitry and software therefore in the form of record cards and sheets of printed matter and coded information which is machine read.

With the above and such other objects as may hereinafter more fully appear, the invention consists of the novel constructions, combinations and arrangements of of parts and methods as will be more fully described and illustrated in the accompanying drawings, but it is to be understood that changes, variations and modifications may be resorted to which fall within the scope of the invention as claimed.

BRIEF DESCRIPTION OF THE DRAWINGS

FIG. 1 is an isometric view of a record card reading and data entry device useful in teaching, training, quizzing and the playing of games.

FIG. 2 is a side view with the side wall of the device of FIG.1 removed and parts broken away and sectioned for clarity.

FIG. 3 is a face view of a record card applicable to the device of FIGS. 1 and 2.

FIG. 4 is a schematic diagram of the electronic controls and electrical components of an interactive electronic system of the type shown in FIGS. 1 and 2 and employing a record card of the type shown in FIG. 3.

FIG. 6 is an isometric view of a modified form of the reading and data entry device of FIGS. 1,2 and 4.

FIG. 7 is a side view with the side wall removed and with parts broken away and sectioned, of the device of FIG. 6.

FIG. 8 is a face view of a record card readable and applicable to the apparatus of FIGS. 6 and 7.

FIG. 9 is a schematic diagram illustrating electronic circuitry and the system used in the apparatus of FIGS. 6 and 7.

FIGS. 1 and 2 illustrate an interactive teaching, training or game device 10 formed of an assembly 11 defined by a hollow base 12 which is preferably made of molded rigid plastic having an upstanding extension 13 of substantially rectangular shape and defining a frame 15 with an opening 14 therein through which a record card 21 may be viewed by a person sitting or standing in front of the device 10. The record card 21, which is illustrated in detail in FIG. 3, has a major surface 21C on which is printed indicia 26, such as one or more words, phrases, sentences and/or illustrations which are associated with or define a quiz, teaching function or routine, game function or the like which may be intelligibly read and discerned by a person viewing same, in a manner to cause such person to interact with electronic means, such as illustrated in FIG. 4, disposed within a housing 29 located in the base 12 as shown in FIG. 2. Also located within said base are one or more batteries B, a loud speaker 19 disposed behind a series of openings 19A in a portion 12B of the top wall of the base, a microphone 20 supported beneath an opening 20A in base top wall 12B, a manually operable bistable switch 18S secured to an extension 12C of the top wall of the base and operable to connect the battery or batteries 40 to the electronic circuitry means in housing 29 as well as to two limit switches 26 and 27 and one or more magnetic pickups 28 located in the vertical extension 13 of the housing. A plurality of normally open, push-button or membrane switches 18 are also mounted on or within the upper wall portion 12C of the base 12 to be selectively depressed and closed by fingers of the hand of an operator for effecting scoring and reaction functions to be described. Notation 12A refers to the bottom wall of the base 12 which is adapted to rest on a table top and notations 12B and 12C respectively refer to the side walls of the base 12.

Figure 5:
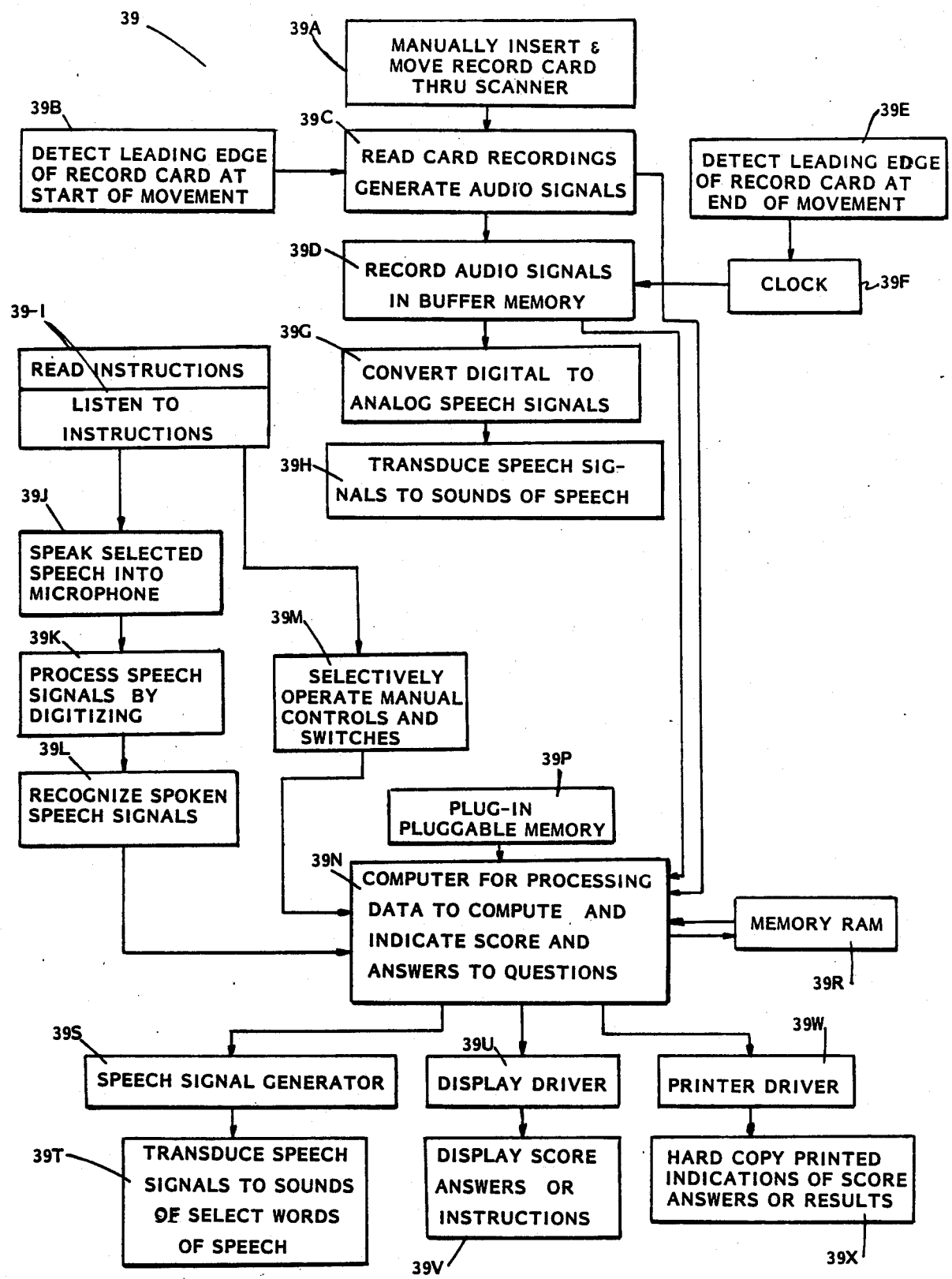
FIG. 5 is a functional diagram illustrating forms of operation of the device and system shown in FIGS. 1 to 4.

Extending along the upper end wall 13A of the upward extension 13 of the housing is a slotted opening 13S which is slightly longer than the width of a card 21 and is shaped to permit selected of a plurality of such cards to be inserted therein and to travel by gravity and/or under the downward pushing movement of the hand through respective channels formed in the vertical extensions of the frame 15 to guide a card to a lowermost position therein, as illustrated in FIG. 1, to operatively locate selected cards with the upper portions of the cards extending above the upper wall 13A of the vertical extension 13 of the housing, to permit the card to be easily removed therefrom when the game or quiz function has been completed by pulling upwardly on the edge guided card.

The record cards 21 are of substantially rectangular shape, as shown in FIG. 3, having lateral edges 22 and 23 and a border portion 24 thereof containing a strip 25 of magnetic recording material coated or bonded thereto and containing one or more magnetic record tracks with one or more code recordings which may be utilized when magnetically reproduced therefrom to effect one or more functions such as coded identification of the card and its contents or printed matter, instructions for use in the operation of a microcomputer or microprocessor as will be described, digitial or analog speech signals for use in the performance of one or more interactive functions between a person viewing the card and the game or quiz scoring electronics, etc.

Limit switch 26 is supported at the upper end of the vertical extension 13 of the housing and contains an actuator which extends across one of the channels formed in the vertical extensions of the frame thereof so as to be actuated to close when a card is first inserted into the slotted opening 13S. Directly adjacent and below the limit switch 26 is a transducer assembly 28 containing one or more magnetic reproduction transducers or pickups operable to scan the one or more tracks of the magnetic recording strip 25 of a card inserted into the opening and caused to move downwardly. If the recordings provided along the strip 25 are in digital form, the closure of the upper limit switch 26 by the leading edge of card when it is first inserted into the slotted opening 13S results in energizing the magnetic head or heads 28 in a manner to permit sensing the recordings provided along the one or more tracks of the magnetic strip. The closure of the limit switch 27 when its actuator is deflected by the leading edge of a card fully inserted into the extension 13 of the housing as illustrated in FIG. 1, is employed to initiate a computing and control function as described hereafter.

In FIG. 4 is shown details of a control system 10S for the apparatus of FIGS. 1 and 2. A microprocessor or microcomputer 30 receives electrical signals generated by the limit switches 26 and 27 when they are actuated by a card inserted into the slotted opening 13 and forced or caused to fall by gravity to the fully inserted position, as shown in FIG. 1, whereby the pertinent printed matter 26 appearing on the face of central area 21C of the card may be read through the opening 14. As the card travels downwardly, a magnetic head or bank of heads 28, denoted 28A–28F, read respective recordings along respective vertically extending tracks of the record strip 25 and generate output coded electrical signals which are amplified in an amplifier or amplifiers 29A and passed to respective inputs of the microprocessor or microcomputer 30. Attendant electrical circuits and devices which are connected to the microprocessor 30 include the microphone 20, an amplifier 31 of its analog speech signals and an analog-to-digital converter 32 for converting speech signals generated on the output of the microphone to digital speech signals which are passed to a speech recognition computer 36 which is programmed or trained to recognize select words of speech spoken by a person operating the apparatus 10, and to generate output control or code signals which are passed to the microprocessor 30 and utilized for control purposes to be described. Keyboard 18 is shown having its output key switch circuits connected to the microprocessor 30. A random access memory [RAM] 33 is connected for two-way communication with the computer 30 while a read only memory [ROM] 34, is pluggably connected to the microprocesor or microcomputer 30 for programming its operation.

An oscillator clock 35 is also shown connected to the microprocessor or microcomputer 30 for properly controlling the operation of certain of the attendant output electrical circuits and devices including the speech recognition computer 36 and its attendant memory 36M and a synthetic speech signal generator 37 which is also operatively connected for two-way communication with the microcomputer 30 and contains a pluggable memory 37M for generating select digital speech signals which are output to a digital-analog converter 19D and passed as converted analog speech signals to a speaker 19 for generating select words of speech, such as instructions, indications of whether or not quiz or game functions were properly effected, indications of scoring, etc. Also connected to the computer 30 is a display driver 38D and a visual electronic display 38, which may vary from one or more lights to a more complex light emitting diode [LED] or liquid crystal [LCD] display for indicating scoring, answers to questions, instructions and the like. The battery or batteries B illustrated as contained within the base 12 in FIG. 2 provides suitable electrical energy for operating all of the components of FIG. 4 and suitable conductors are assumed to be employed to connect said battery to the correct sides of all electrical components employed.

FIG. 5 is a functional diagram of the interactive steps involved in the operation of an interactive teaching, quizzing or game system as defined by the card reading apparatus 10 of FIGS. 1 to 4. The functional teaching or quizzing system is denoted 39 and involves the manual insertion, in step 39A, of a record card, such as card 21, into a recepticle, such as the slotted opening 13S and its movement along a guideway to an operative or viewing position such as shown in FIG. 1. During such movement, the leading edge of the card is detected by a first limit switch 26 in step 39B which generates a signal which is applied to activate and energize the magnetic pick-ups 28 which read the codes or audio signals recorded along the one or more tracks of the magnetic recording strip 25 resulting in step 39C in which audio or code signals are generated and are recorded in a buffer memory which may form part of the computer 30 or be part of an auxilliary memory such as the RAM 33, such function being effected in step 29D. When the leading edge of the card is detected by or actuates limit switch 27, as in step 39E the limit switch controls the operation of a clock, such as a stable oscillator with feedback control, which is operable when so activated to control the buffer memory when all the information on the card recording area 25 has ben reproduced therefrom, to clock such information as properly timed signals, out of the buffer and apply same, if they are digital speech signals, to a digital-to-analog converter (e.g. 19D) in step 39G which analog speech signals are transduced by a speaker, as in step 39H, to sounds of words of speech which may comprise one or more words, phrases or sentences defining a question or questions, an instruction or instructions, a clue or other data, music or a combination of such sound phenomena.

If any or all of the signals reproduced from the record card defines data to be used in computing, displaying, printing or performing any other function, such signals may be either directly applied to a computer or microprocessor as in FIG. 4 and defined in step 39N, to be described, or may be recorded in the buffer, as in step 39D, and may be thereafter reproduced therefrom as described and applied directly to the computer as shown.

Upon reading the printed instructions on the card after it is fully inserted or moved along its guideway or after listening to a question or instruction defined by words of speech effected in step 39H, a person operating the device 10 may then perform one or more interactive functions such as speaking one or more select words of speech into the microphone 20, as in step 39J, or may selectively operate one or more manual switches, such as 18, or may operate a dial or dials, a mouse or light pen (not shown) to program or control the operation of the computer so as to cause it to effect one or more functions such as selectively activate a synthetic speech signal generator, as in step 39S; a display driver, as in step 39U or a printer driver, as in step 39W to effect the respective functions defined in steps 39T, 39V and 39X of generating selected sounds of select words of speech, displaying a score or instruction, a move, a command or providing an answer to a question or a print out of data such as a score, totalling of a score, answer to a question or a combination of such forms of information.

Steps 39J, 39K and 39L respectively define speaking the select interactive speech, such as an answer to a question and/or reaction to the printed instruction read from the card and/or reaction to the speech played back in step 39H. The computing step or steps is defined by notation 39N and notation 39R refers to the step in which the computer queries a memory, such as a RAM 33 or ROM 34 in order to properly function and react to instructions.

If the speech signal generator employed in step 39S is a solid state microelectronic chip, as described, it may contain its own timing control or oscillator or such may be applied externally thereof and controlled by the computer or an auxiliary control such as a clock or oscillator 35 of FIG. 4. The speech signals generated by the microphone, as in step 39J, may be processed and recognized by a speech recognition computer 36, such as the General Instruments SP-1000 or the like. Such latter microelectronic computer also contains a synthetic speech signal generator which may be employed in step 39T.

FIGS. 6 and 7 illustrate another form of the invention involving a record card positioning apparatus 40 defined by a housing 41 formed with a lower horizontally extending base portion 42 and having an upwardly extending tapered housing portion 43 at one end of the base portion. A display, such as an electronic display or an auxiliary record card, may be disposed behind a rectangular opening 44 in the upwardly extending housing portion 43 to permit the person operating or interacting with the device 40 to view either an auxiliary illustration on an auxiliary card or on the face of an electrical display 44D, such as a panel display, plasma display, liquid crystal diode display, light emitting diode display or the like.

The base 42 of the housing 41 has a flat bottom wall or edge 42A permitting it to stand upright on a surface, respective upwardly extending side walls 42B and 42C, a flat horizontal top wall 42D extending to a downwardly slanted front end portion thereof 42E containing a central opening 42F behind which is disposed a loud speaker 19B. Also supported on the extension 42E of the top wall are a plurality of normally open push-button switches 50 for selective manual operation by an operator of the device in answering true or false, yes or no or multiple choice questions by means of their selective operation. Switches 50 may or may not be coded.

Centrally supported by and extending upwardly from the top wall 42D is a U-shaped frame 46 having side leg portions 47A and 47B connected to a lower frame portion 47C, for positioning and retaining a flat record card or sheet 51 within such frame. A retainer 48 for the sheet 51 is pivotally supported at the upper end of the top wall 42D and may be manually pivotted to cause its end to engage and retain a record sheet or card in position, as shown, within the U-shaped frame 46.

An extension 47D of the lower leg 47C of the frame 46 contains a plurality of photo-electric detectors 49 and a light source to permit said detectors to detect a printed code 53 applied along the lower edge of a record card 51 as shown in FIG. 8. By scanning such code when the card is fully inserted within the U-shaped frame and under the extension 47D thereof, the card may be identified by a computer, such as a microprocessor or microcomputer 55 located with a housing 54H supported within the base portion 42, as shown in FIG. 7, and containing an electronic system 54 for controlling a quiz or game playing function.

Supported within the confines of the frame 46 and located within an opening in the upper wall 42D or disposed thereon, is a bank of finger actuated, normally pen switches, preferably made of a membrane switch panel 55. When individual switches of the panel 55 are selectively closed by finger operation, signals are generated and transmitted to the electronic circuitry existing within the housing 54H immediately therebeneath. The array of finger operated switches may be disposed in the membrane switch assembly as a rectangular array of a plurality of rows of such switches or as individual switches which are so positioned that select portions of each sheet or card disposed within the U-frame 46 will be directly aligned with select switches and may be so indicated for selective operation by pressing against select portions of the sheet or card when properly aligned in the frame, by printed indicia, color or blank areas of the sheet or card adjacent to or containing such indicia as individual characters, words, numbers, arrows or other means.

FIG. 8 illustrates details of a typical record card or sheet 51 which may be manually placed in the confines of the U-shaped frame 47 to predeterminately position the card with respect to the membrane or pushbutton switches 55 which are located within the confines of such frame and are accessible to be actuated or closed by finger pressure applied to selected of such switches through such card or sheet when so aligned thereover. The flexible rectangular card or sheet 51 has at least one side, if not both, of its major surface 51A containing printed indicia 52, which may comprise symbols or a plurality of drawings, photographs or characters, such as one or more printed words defining a question to be answered or instruction to be followed. Notations 52A,52B, 52C, etc. refer to areas of the sheet 51 delineated or indicated by printing, such as circular or otherwise shaped outlines or color indications, one or more of which a person may touch and depress to actuate a select of the plurality of membrane switches 55 aligned with the particular area of the sheet so marked, so as to effect a particular test, quiz or game function when the respective switch or switches of the bank 55 of such switches is so actuated to close. Closure of a single of the switches 55A,55B, 55C,55D,etc. of the bank 55 thereof may be used to activate a select circuit of a microelectronic computer or microprocessor to which the particular record card has been identified, by the selective operation of the switches 50 on the upper wall portion 42E of the housing and/or by sensing a code 53 defined by a plurality of printed marks along the lower edge of the card 51, when the card is inserted in the frame 47 and such code is sensed by a plurality of sensors 49 supported on an extension 47D of the lower leg 47C of the frame as described in the description of FIG. 9. Signals generated by a combination of selected operations of switches 50 and sensors 40 as well as selected of the switches 51 may be used to program and operate the computing or logical electrical circuitry employed in housing 54H to effect selected scoring and activation of the display 44D as well as speech generated on the output of speaker 19.

In FIG. 9, the plurality of photoelectric detectors 49 are shown disposed immediately adjacent to the lower border of the card 51 when it is properly inserted into and disposed within the U-shaped frame 46 and output respective signals, derived in scanning respective of the printed indicia 53, to a microprocessor or microcomputer 55. Attendant electrical circuits and devices for the microprocessor or computer 56 include, as provided in FIG. 4, a plurality of memories including a RAM 34, a pluggable ROM 33, a memory 37M for a synthetic speech signal generator 37, a memory 36M for a speech recognition computer 36, etc. Also connected for two-way communication with the microcomputer 56 is a clock 35 for generating timed control signals for properly controlling the operation of certain of the attendant devices including a speech signal generator 37, the speech recognition computer 56, the memories illustrated, a digital-to-analog converter 19D for a loud speaker 19 which receives synthetic speech signals generated by the generator 37 and any auxiliary attendant devices. Thus, when an operator of the apparatus 40 is instructed by means of the display 39, synthetic speech generated by the speaker 19 or instructions printed on a sheet or card 51 disposed within the frame 46, to apply finger pressure to one or more select areas of the sheet 51, such as indicia 52 printed thereon, selected of the switches of the membrane switch panel 55 are compressed and actuated to close, thus generating electrical signals on selected of the output circuits of the switches which extend to the microcomputer 56 and such signals are employed to selectively operate the computer and cause it to generate output signals for selectively controlling the operation of the speech signal generator 37 and/or one of the other attendant devices such as the display 39 or a plurality of auxiliary displays, such as individual lights 59, 60 and 61 which are driven by respective display drivers 59D, 60D and 61D connected to the microcomputer or microprocessor 56.

Notation 63 refers to a timer which is activated by a signal from the microprocessor or computer 56 generated in response to a signal from one of the edge mark sensors 49 when a printed card or sheet is properly inserted into the recepticle or guide 45. Such timer 63 may peform one or more functions relating to the operation of the system 54 including shutting off power from the battery 63 by causing switch 57 to open. Timer 63, or another timer (not shown) connected to the microprocessor 56, and controlled thereby, may also be employed to time a response allowing the operator or person being quizzed to answer a question or perform a function defined by printed indicia on the sheet or card, within a select number of seconds after the sheet or card is inserted and the coded edge data thereof read. In the latter function, activation of such timer 63 may result in one or more timed signals being generated thereafter, which may be applied to the computer to compute a score in accordance with the time it takes to answer.

Figure 10:
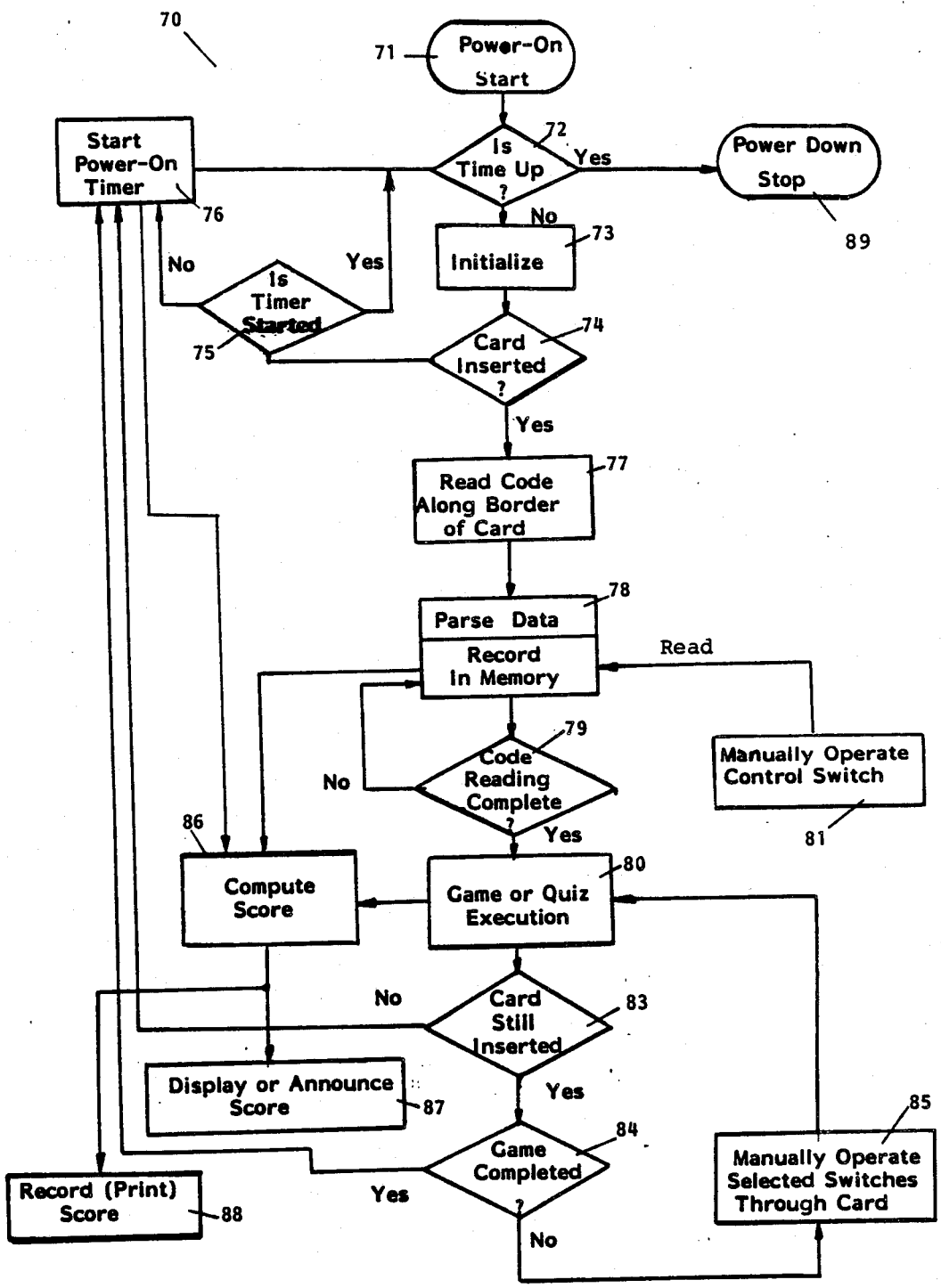
FIG. 10 is a flow diagram applicable to educational testing system and method defined by the apparatus shown in FIGS. 6-9.

A game-independent logic flow control diagram applicable to the game apparatus and system illustrated in FIGS. 6–9 is shown in FIG. 10. The game or quiz operating procedure 70 is initiated with power up effected at

71. At start up, power down timer sequence has not been initiated, causing control to pass through logic steps 72 and 72 resulting in initiations of the operation of procedural variables including one or more counters. At step 74, card edge sensor operation is checked. A power-on start timer 76 may be employed, activated when a limit switch or one of the electro-optical sensors 49 senses the lower edge of the card or sheet or a printed mark thereon when inserted into the recepticle 47D. Such timer may be employed to shut off power if the card or sheet is left in place for a time interval indicative of inactivity and/or as an interval timer in computing a score by limiting the time in which a selected of the manually operated pressure switches 55 may be finger operated by the player or student.

At step 78, the digital data read from the printed code strip 53 of the card is parsed into instructions for the computer. A portion portions of the signals generated as a code or codes in reading such code strip, may also be applied directly or indirectly to the speech signal generator 37 to generate select speech signals which, when transduced to sounds of select words of speech by speaker 19 after being converted to analog speech signals, may be used to issue verbal instructions and the like to the operator. If the card or sheet is properly inserted into the receptacle and the edge code or codes are properly read, the computer is signalled and execution of the game or quiz step 80 may be effected in response to the energization of a display lamp, step 80A, or after synthetic speech signal generator 37 causes select speech or sound to be generated.

Electronic computing functions with respect to the data generated when the card edge code is read and when the one or more membrane switches 55 are manually closed by finger pressure applied through a select portion or portions of the record sheet aligned with the membrane switches, are effected in step 86 which results in the controlled operation of the display 39 and/or speech signal generator 37 in step 87 to display or announce the score and/or further instructions to the player or operator. For each game or game step relating to a single sheet or card, a hard copy printer may be operated, as in step 88, under the control of the computer to provide a print-out of answers given and/or score. Total score announcement, display and/or printout may be automatically effected by the computer in accordance with signals generated from the printed codes of the last card read and/or by manually depressing a selected of the switches 55 through the last card as instructed by printed words or indicia on such last card or sheet when properly inserted into the receptacle 46.

Variations in the electronic teaching, quizzing and game systems hereinbefore described, which form part of the instant invention are noted as follows:

1. The device 10 of FIGS. 1 and 2 may be varied in physical configuration including the construction and location of the guideway or guides for the record card 21, the location of the slotted opening 13S to vary the direction in which the card is fed by hand or gravity to its viewing and operative location. For example, the slotted opening or slot 13S may be provided in one of the side walls 13B or 13C of the vertical extension 13 of the housing 11 to permit the card to be manually pushed through such vertical extension and guided thereacross to the operative location shown by guideways formed in the lower and upper portions of the housing extension 13. In such an arrangement, the magnetic pick-up or transducers 28 may be supported along the upper and/or lower portions of the housing extension 13 to sense the magnetic recording or recordings provided along a magnetic recording strip or tape which is secured to the lower and/or upper border portions of the record card rather than the side or lateral border portions 24 of FIG. 3.

2. All or a substantial portion of the housing extension 13 of the embodiment of FIGS. 1 and 2 may also be eliminated if a passageway which is slightly wider than the width of a card and is open at one side, is formed in the upper wall of the base 12, for example, at the location of the extension 13, to permit each card to be inserted therein from the side of the base and manually pushed along such passageway until it engages a stop at the other end thereof which positions the card approximately in the location shown in FIG. 1 after one or more transducers, supported adjacent such passageway, scan a magnetic record strip along the lower border of the card and disposed within such passageway, for the purposes described above.

3. Both the housing and the means for positioning a sheet or paper or card, such as record sheet 51, at a viewable location above or across an array of pressure sensitive switches, as shown in FIGS. 6 and 7, may be subject to variations in configuration other than that shown in such drawings. For example, the U-shaped frame 46 may be open at the side rather than the top, a shown to permit side loading or insertion of the printed sheet or card. Such frame may be replaced by a rectangular depression in the top wall 42D or a plurality of projections therefrom for properly locating the sheet 51 to permit certain printed locations thereof to align with respective of the membrane switches, as described.

4. In a particular mode of operation of the system defined in FIGS. 1 to 5, a plurality of parallel record tracks are provided along the magnetic recording material 25 of the border portion 24 of a card and are simultaneously scanned as the card moves through the guideway to its operative or at-rest position as shown in FIG. 1. The recordings may comprise either or both coded data and digital audio signals of select words of speech and/or music, which are recorded, as they are reproduced, in a solid state memory, such as RAM 33 or another erasable and selectively addressable memory 33A, shown connected for two-way communication with the microprocessor or computer 30. Such signals may thereafter be clocked out of such memory immediately after being fully recorded therein or at one or more times during a quiz or game playing cycle, either in its entirety or when select portions of such recordings are reproduced in response to address signals generated by the microprocessor 30 as the quiz or game procedure progresses in accordance with the operation of the switches 18 and/or the speech recognition computer 36 and the control signals generated thereby.

5. Data recordings in a form other than magnetic recordings, may be provided along one or more borders of a card, such as card 21 while card 51 may contain magnetic recordings along its lower border to be read when the sheet is moved into the receptacle or scanning means defined by overhanging wall 47D. Such recordings may comprise printed bar-codes which are electro-optically scannable by one or more photodetectors and a light source, punchings or cut-outs, edge notches, embossings and the like.

6. In a preferred embodiment, the recordings provided along the border of the record card, such as recording area 25 of the card 21 of FIG. 3, preferably comprise digital signal recordings of both speech signals or code recordings capable or controlling a memory, such as memory 37 of FIG.4 or memory 37M of FIG. 9 to reproduce select speech signals for conversion to select words of speech on the output of the speaker 19, together with digital recordings of codes or data to be used by the computer or microprocessor 30 or 56 in computing scoring and the like. Such digital speech signals may be immediately converted to sounds of select words of speech which may comprise a question or questions to be asked the player or student, instructions for conducting the quiz or game, etc. while the data signals which are reproduced simultaneously or in sequence therewith are applied to program the computer, address a memory to cause it to apply a select portion of its data to the computer and/or the speech signal generator to cause it to generate select speech signals from its memory or to compose speech signals of one or more select words of speech from alophone recordings recorded in memory, which alophone signals are assembled and recorded in memory and clocked out of such memory to generate one or more select words of speech on the output of the speaker.

7. In the embodiment illustrated in FIGS. 1 to 4, the reproduction transducers 28 may comprise closely spaced magnetic reproduction transducers adapted to simultaneously scan respective closely spaced paralell record tracks of a magnetic strip or band, such as strip 25 of FIG. 3, or a plurality of photoelectric detectors adapted to scan respective closely spaced photo-optically scannable printed, embossed or laser beam generated cavity defining deigital recordings along respect parallel tracks of the band area of the cards. Such recordings may comrpise a single message or a plurality of messages which are all recorded in solid state memory, as described, when the card is moved by hand throught the guideway of the reader-housing and scanning is effected by said plurality of reproduction transducers. Selected of such messages or all thereof may be sequentially clocked our of such memory and applied to generate one or a series of sounds of select words of speech on the output of a speaker or to operate a display such as a cathod ray video display or the like to display the entire message or selected portions thereof as each portion of the message each message is controllably reproduced from such memory. Such controlled reproduction of messages or message portion may be effected by the computer or microprocessor 30 in response to data generated when the operator selectively operates the switches 18 and/or speaks select words of speech into to microphone 30.

The voice signal recognition computer 36 may be made in accordance with speech recognition devices and systems produced by such copanies as Threshold Technology Inc. of Delrain, N.J.; Dialog Systems, Inc., Belmont, Mass.; Scott Instruments, Denton, Tex.; Huristics, Inc., Sunnyvale, Calif.; and others. The message player unit or synthetic speech signal generator 37 may be derivable from or contain components manufactured by such companies as Texas Instruments Corp., Dallas, Tex. [using their TNC 0820 or other speech signal generating circuits]; Telesensory Systems, Inc., Palo Alto, Calif.; Vortax Division, Federal Screw Works, Troy, Mich.; Periphonics, Bohemia, N.Y.; Interstate Electronics, Inc. Anaheim, Calif. and others.

It should be understood with respect to the systems 10S and 54 illustrated and described above, that power supplies having the correct polarities and magnitudes are provided, where not indicated in the drawings, so as to supply proper electrical energy for appropriately operating the various illustrated circuits as described in the specification and in a manner to properly perform the functions described.

The following U.S. patents relating to magnetic and electro-optical recording and reproduction systems are made of record:

U.S. Pat. No. 3,434,130—Record Card Scanning Apparatus

U.S. Pat. No. Re: 31,239—Information Storage System

U.S. Pat. No. 3,646,258—Computing Apparatus

U.S. Pat. No. 3,803,350—Record Card Scanning Apparatus

U.S. Pat. No. 3,818,500—Card Transducing Apparatus & Method

U.S. Pat. No. 3,943,563—System and Method for Recording and Reproducing Video Information on a Card, U.S. Pat. No. 4,121,249—Card Recording and Reproduction Apparatus and Method U.S. Pat. No. 4,212,037—Method for Scanning a Card with a Video Signal U.S. Pat. No. 4,084,198—Card Scanning Video System U.S. Pat. No. 4,040,097—Magnetic Card Reader with Movable Magnetic Head U.S. Pat. No. 2,743,317—Magnetic Recording Machine U.S. Pat. No. 4,078,316—Real Time Conversational Toy U.S. Pat. No. 4,464,124—Electrical Educational Device

What is claimed is:

1. An interactive information system comprising:
  (a) a support,
  (b) means for supporting and predeterminately positioning a record member on said support, which record member contains visually readable indicia and a machine readable code recording extending parallel to an edge of said record member,
  (c) means supported by said support for automatically reading the code recording of a record member which is predeterminately positioned on said support and generating electrical signals indicative of information defined by said code read,
  (d) electronic computing means supported by said support for receiving and performing computing functions with respect to electrical signals received from said reading means when reading the machine readable recording of a record member,
  (e) selectively operable control means operable by a person visually reading the indicia of a record member after it has been read by said reading means and supported by said support for controlling the operation of said electronic computing means in accordance with the signals generated by said reading means when it reads the machine readable recordings of a record member supported by said support, and
  (f) means supported by said support and controlled by said electronic computing means for intelligibly indicating the results of the operations of said electronic computing means on the data received from said reading means and the operation of said selectively operable control means by the person reading the visually readable data of the record member read by said reading means.

2. An apparatus in accordance with claim 1 wherein said record member is a card containing magnetic recordings defining said machine readable recording extending parallel to an edge of said card.

3. An apparatus in accordance with claim 2 wherein said card contains a plurality of tracks containing said magnetic recordings and said reading means comprises a plurality of magnetic reproduction transducers each operable to read a respective of said tracks simultaneously as the other tracks are read, and a buffer memory for simultaneously recording the outputs of said 4. An apparatus in accordance with claim 1 including a plurality of normally open switches supported by said support adjacent a record member which is predeterminately aligned on said support.

5. An apparatus in accordance with claim 4 wherein said plurality of switches are disposed immediately behind a card which is predeterminately located on and supported by said support such that, when selected portions of a card are touched and depressed by the finger of the hand of a person located adjacent said support, selected of said plurality of normally open switches become temporarily closed.

6. An apparatus in accordance with claim 4 wherein said normally open switches comprise respective thin, membrane switches.

7. An apparatus in accordance with claim 6 wherein said card contains indicia printed thereon which indicate select locations of the card which may be depressed by hand to cause respective normally open switches disposed bheind a card, which is predeterminately located and supported by said support, to be respectively closed for variably controlling said electronic computing means in accordance with the switches so closed.

8. An apparatus in accordance with claim 1 wherein said intelligible indicating means comprises means for generating different speech signals in accordance with the activation of respective of said switches and transducing said different speech signals to select words of speech.

9. An apparatus in accordance with claim 1 wherein said electrically operable control means comprises a speech signal recognition computing means and a microphone into which select speech may be spoken by a person viewing a record member supported by said support, electronic means for processing speech signals output by said microphone and connected to said speech signal recognition computing means to process speech signals in a manner such that select speech spoken into said microphone may be recognized and means for generating respective control signals on the output of said computing means each time select speech signals are recognized thereby, means for applying said control signals to control the operation of said intelligible indicating means to cause it to indicate the results of the operation of said electronic computing means on the data received thereby from said reading means and said speech signal recognition means.

10. An apparatus in accordance with claim 9 wherein said intelligible indicating means comprises a synthetic speech signal generating means for generating signals of select speech and means for transducing said select speech signals to sounds of select words of speech in the vicinity of said support.

11. An apparatus in accordance with claim 9 wherein said intelligible indicating means comprises a visual display means for displaying visual indications of the results of the operation of said electronic computing means on the data it receives.

12. An apparatus in accordance with claim 1 including a light pen operable to read printed indicia, and wherein said record member contains printed indicia located to be scannable by said light pen when said record member is predeterminately positioned on said support.

13. An apparatus in accordance with claim 1 wherein said record member is a rectangular record card, and said positioning means includes a guide means for contacting at least one edge of said card and guiding said card along a fixed path to an operable location on said support at which operable location said card may be visually read, said reading means being operable to read the machine readable recording of a card as it is caused to travel said fixed path defined by said guide means.

14. An apparatus in accordance with claim 13 wherein said support includes a base and said guide means extends upwardly from said base and is defined by upwardly extending parallel channels for receiving and guiding respective lateral border portions of a record card in movement therealong, said guide means being open at the top to receive a record card and operable to guide said record card in travel downwardly, and means for stopping the downward travel of a record card guided downwardly by said guide means to position said record card at an operable location whereby the visually readable indicia thereof may be read, said reading means being supported adjacent said guide means at a location to permit it to read the machine readable recordings of a card as it travels downwardly along said guide means to said operable location.

15. An interactive educational apparatus comprising:
(a) a support,
(b) first means defining a guideway supported by said support for guiding a rectangular record card in a fixed path, which card contains visually readable information provided on a surface of said card and a band-like recording area containing digital data recordings extending parallel to the direction of travel of said card along said fixws path,
(c) receiving means for receiving one end of a manually held record card and aligning said card with said guideway to permit said card to travel thereafter along said fixed path defined by said guideway,
(d) second means supported by said support for stopping the movement of a card travelling said guideway to dispose said card at a reading location on said support whereby the visually readable information on the card may be visually read by a person adjacent said support,
(e) third means including a first transducer supported by said support for sensing the digital recordings on the band-like recording area of a card as it is moved along said guideway and generating digital electrical signals,
(f) a memory operable to receive and record the digital electrical signals generated by said third means,
(g) fourth means for reproducing the digital information recorded in said memory,
(h) fifth means for controlling said fourth means after the signals sensed by said first transducer have been recorded in said memory and generating digital information signals, and
(i) sixth means for receiving said digital information signals reproduced from said memory and transducing same to a human intelligible form.

16. An apparatus in accordance with claim 15 wherein the recordings contained along said band-like recording area of said card are digital audio recordings and said sixth means includes a digital-analog signal converter for converting said digital audio signals to analog audio signals and a transducer for transducing said analog audio signals to audible sounds.

17. An apparatus in accordance with claim 16 wherein the digital audio recordings provided along said band-like recording area of said card are digital signals defining select words of speech and said latter transducer comprises a speaker for converting the analog signals derived from the digital speech signals reproduced from the band-like area of a card to sounds of select words of speech.

18. An apparatus in accordance with claim 15 wherein the recordings provided along said band-like recording area of said card comprise both audio signal recordings and digital data signal recordings, electronic computing means operable to receive signal reproductions of the digital data recordings reproduced by said fourth means from said memory and to perform computing operations with respect thereto, said sixth means being operatively controllable by said electronic computing means in accordance with signals recorded in a reproduced from said memory, said third means including means for reproducing audio signal recordings from the band-like recording area of a card and a speaker supported by said support for receiving signals generated from audio signal recordings provided on a record card and transducing same to sounds of select words of speech.

19. A method of recording and reproducing information with respect to record cards comprising:
   (a) recording data defining a message along a plurality of closely spaced record tracks extending along a select portion of a record member, such as a record card,
   (b) effecting relative scanning movement between said record member and a plurality of reproduction transducers each of which is operable to sense and reproduce recordings from a respective of said record tracks to cause said transducers to simultaneously generate output electrical signals defining the recorded information scanned thereby,
   (c) simultaneously recording the signals output by each of said transducers at respective locations of a memory, and
   (d) thereafter sequentially addressing said respective locations of said memory in a manner to reproduce and generate signals therefrom in a predetermined sequential order to define said message.

20. A method in accordance with claim 19 wherein the data defining said message is in the form of digital audio signals, such as digital speech signals defining a plurality of words of speech and the recording of such digital audio signals and their reproduction from said memory is such as to generate a train of digital speech signals, further including transducing said train of digital speech signals to sounds of select words of speech defining an intelligible phrase or sentence.

* * * * *